United States Patent [19]
Fukasawa

[11] Patent Number: 5,937,166
[45] Date of Patent: Aug. 10, 1999

[54] METHOD AND APPARATUS FOR INFORMATION PROCESSING

[75] Inventor: Toshihiko Fukasawa, Tokyo, Japan

[73] Assignee: Canon Kabushiki Kaisha, Tokyo, Japan

[21] Appl. No.: 08/623,303

[22] Filed: Mar. 28, 1996

[30]     Foreign Application Priority Data

Mar. 30, 1995   [JP]   Japan ..................................... 7-073186

[51] Int. Cl.⁶ .................................................. G06F 17/00
[52] U.S. Cl. ....................................................... 395/200.59
[58] Field of Search ......................... 395/200.34, 200.35, 395/200.59; 345/330, 331

[56]             References Cited

U.S. PATENT DOCUMENTS

| | | | |
|---|---|---|---|
| 5,392,400 | 2/1995 | Berkowitz et al. ................ | 395/200.35 |
| 5,398,336 | 3/1995 | Tantry et al. ...................... | 395/200.35 |
| 5,557,725 | 9/1996 | Ansberry et al. .................. | 395/200.34 |
| 5,617,539 | 4/1997 | Luwig et al. ...................... | 395/200.34 |

*Primary Examiner*—Ellis B. Ramirez
*Attorney, Agent, or Firm*—Fitzpatrick, Cella, Harper & Scinto

[57]             ABSTRACT

A method and apparatus for information processing which is capable of achieving a flexible floor control which can be shared by different applications, and which can respond to floor models of separate applications. An information processing apparatus is provided which controls floors of applications operated in a work environment formed by one or more computers. A FloorUnit representing an application which is an object of a floor control is controlled in association with each application. In addition, a FloorSpace representing a collection to which the FloorUnit belongs is controlled. When the application makes a request for acquiring the floor, the floor of the application in the FloorSpace to which the corresponding FloorUnit belongs is acquired by a FloorPolicy defined by the floor data in accordance with predetermined procedures.

24 Claims, 15 Drawing Sheets

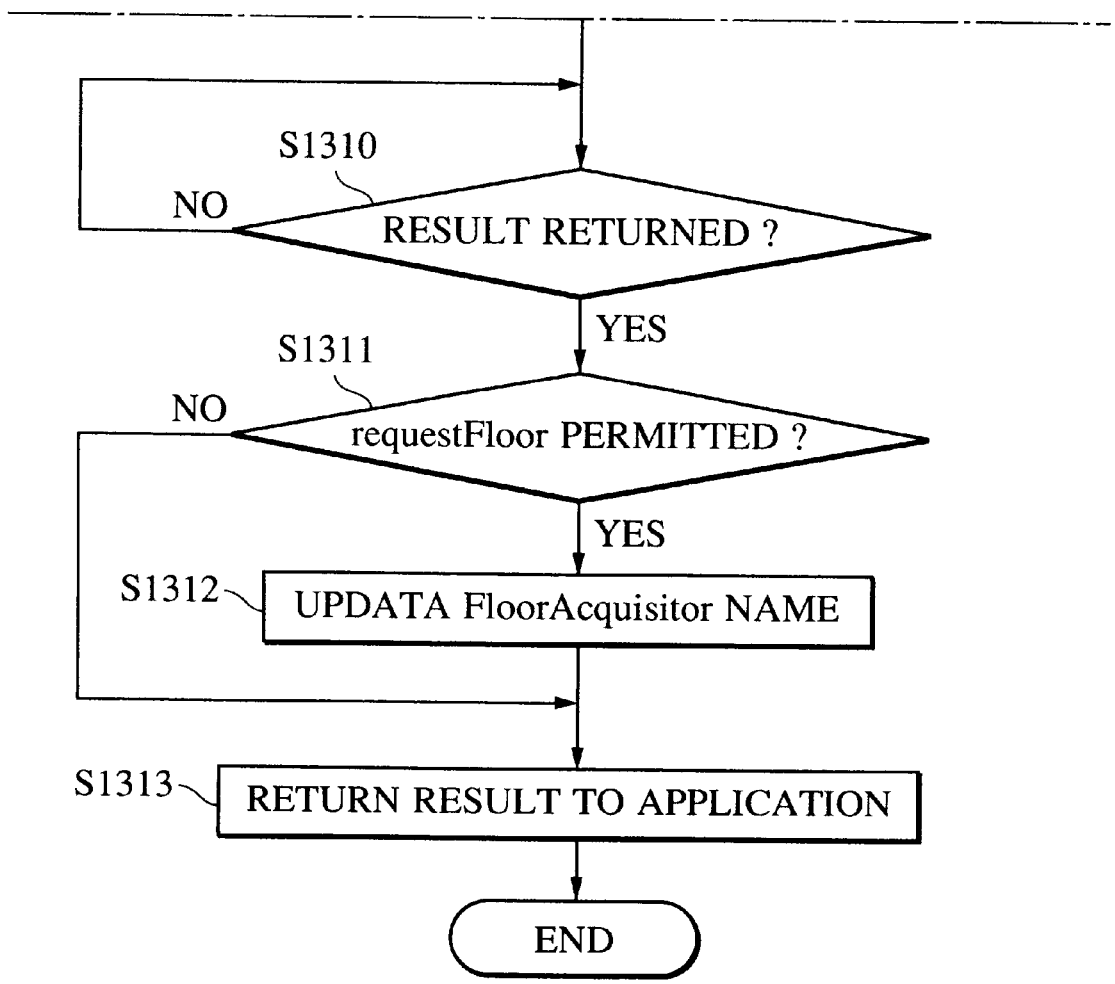

METHOD AND APPARATUS FOR INFORMATION PROCESSING

BACKGROUND OF THE INVENTION

1. Field of the Invention

The present invention relates to a method and apparatus for information processing which support co-operative work on one or more computers.

2. Description of the Related Art

Recently, as the penetration of high-speed LAN and WAN increases, a system (groupware in a narrow sense) has been proposed and actually utilized in which a place for simultaneous work by a plurality of users is implemented on computers by linking and operating various application programs on a plurality of computers connected by a network. In such a system, data, such as images and documents, and resources such as application programs, are shared and utilized by a plurality of users. If the operation of resources is performed simultaneously by a plurality of users, it becomes difficult to maintain the consistency of the contents of the data and the state of the application, and operate the system correctly. For this reason, a mechanism for avoiding a conflicts in the users' references and operations of the shared resource is needed.

In order to implement such a mechanism, two methods have been proposed: one is an access right control method and the other is a floor control method.

The access right control method is one in which the resource is regarded as data, such as images and documents, and an access right (the right to access and modify data) is specified in respect of each user. Each user can work with only the data to which he has an access right. A method based on an access control list and a capability list is commonly used (See "Operating Systems: Design and Implementation. ANDRAEW S. TANENBAUM, Prentice-Hall, 1987" etc. for the access control list and capability list).

On the other hand, according to the floor control method, an application is regarded as a resource, and a floor (the right to operate the application) is given to the user in accordance with the different circumstances. Only the user (or the application as an agency thereof) having the floor can perform an operation on the system.

The access right control method is utilized in systems which provide a relatively simple structure and only a few operation (or calculation) systems. A file system in a UNIX (trade mark) operating system is a typical example in which the access right control method is applied.

On the other hand, the floor control method is utilized in systems in which the operation of a complicated application program which can change dynamically as circumstances demand is required. For this reason, a resource control method based on the floor control method is mainly used in groupware systems.

However, the above-described two methods are not at all exclusive methods, and there is a system in which the access right control method is utilized as a part of a mechanism for determining the floor in the resource control method. Since many operating systems provide file systems with an access right control methods, the floor control method constructed thereon can utilize the access right control system.

Conventionally, a floor control method suitable for a groupware system has been implemented by incorporating the mechanism of the floor control separately in each application operated on the groupware system. In many cases, incorporation is adopted in which one process for effecting centralized control of the floor is provided, and each application acquires or releases the floor by communication with the floor control server.

However, the conventional floor control method raises the following problems:

1) Since the floor control mechanism must be packaged on each of the applications, the application program becomes complicated. Thus, it is difficult to develop the application.
2) It is difficult to implement the floor control among the different applications.
3) Since entities which compete with each other for the floor are restricted to the application program, it is difficult to employ a specific operation and a module to be incorporated dynamically as objects of the floor control.

SUMMARY OF THE INVENTION

It is an object of the present invention to provide a method and apparatus for information processing which is capable of achieving a flexible floor control which can be shared by different applications, and which can respond to floor models of separate applications.

It is another object of the present invention to provide a floor control which can respond to an application environment in which floor spaces form a complicated hierarchical structure.

It is further object of the present invention to provide a flexible floor control which can respond to a dynamic change in a configuration of the floor spaces due to a start and end of the application.

It is still further object of the present invention to implement a floor control providing the above-described functions but without putting a load to an application developer.

According to an embodiment of the present invention, there is provided an information processing apparatus for controlling floors of applications operated in a work environment formed by one or more units of computers, comprising: first control means for controlling unit data representing an application which is an object of floor control; second control means for controlling floor data representing a collection to which the unit data belongs; and acquisition means for acquiring a floor of the application in floor data to which corresponding unit data belongs by the procedure specified in the floor data in compliance with a request from the application.

Further objects, features and advantages of the present invention will become apparent from the following description of the preferred embodiments with reference to the attached drawings.

DETAILED DESCRIPTION OF THE PREFERRED EMBODIMENTS

The preferred embodiments of the present invention will be described with reference to the accompanying drawings.
First Embodiment FIG. 1 illustrates a configuration of a floor control mechanism in a cooperation-type groupware system of a first embodiment.

According to the cooperation-type groupware system of this embodiment, a plurality of users use a plurality of applications in each user environment, and exchange various data between users and applications to provide group co-operative work environments. The system provides a floor control mechanism shown in FIG. 1 in order to maintain consistency of operation among the applications.

Figure 1:
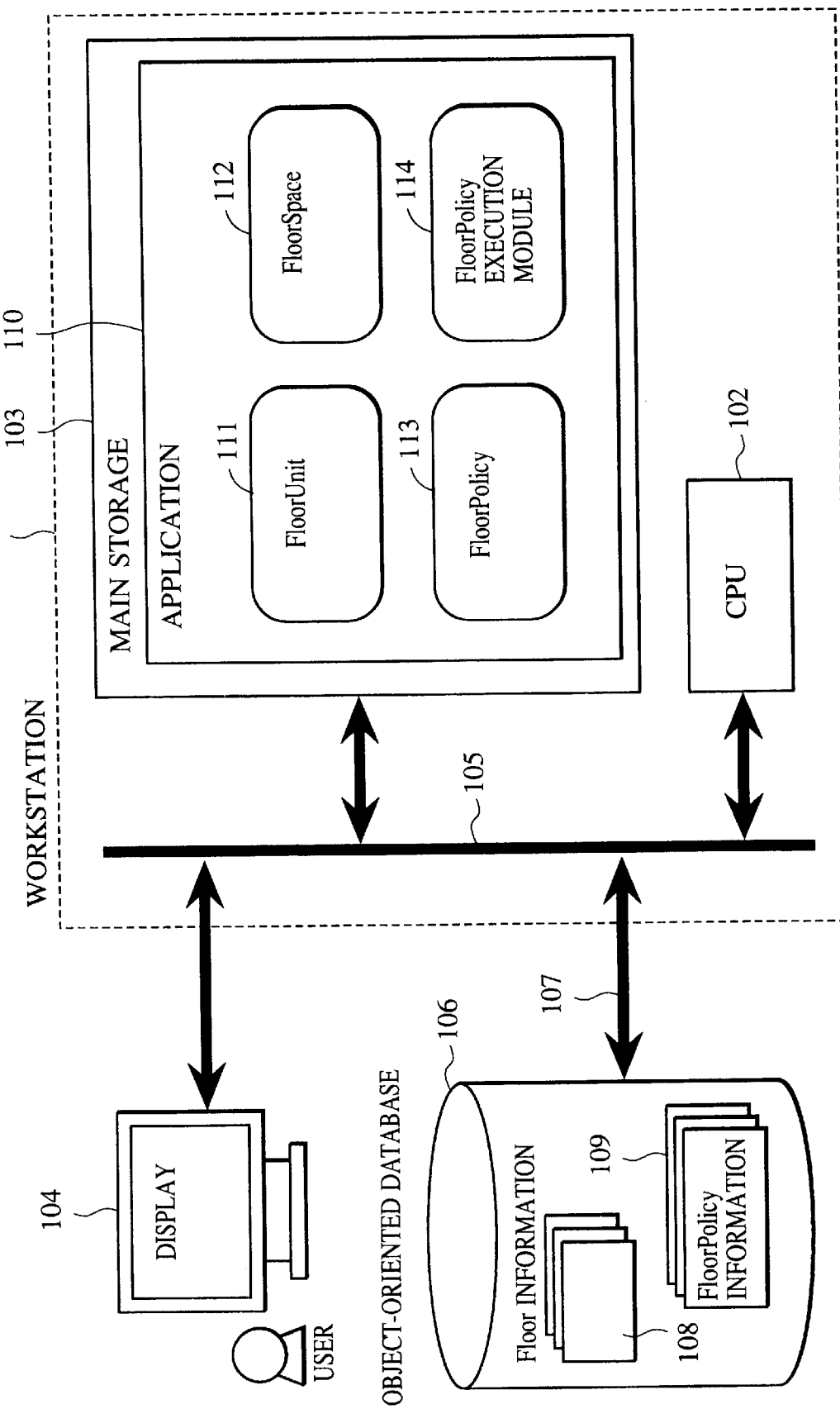
FIG. 1 illustrates a configuration of a floor control mechanism in a cooperation-type groupware system according to a first embodiment of the present invention.

Referring to FIG. 1, a workstation 101 consists of a CPU 102 executing processes of this embodiment, and a main storage 103 holding applications which make up the cooperative groupware system of this embodiment. The CPU 102 and the main storage 103 are connected by a computer bus 105.

A display 104 is also connected to the workstation 101 by the computer bus 105.

In this embodiment, floor control is achieved by utilizing data used for controlling the floor and an object-oriented database 106. The object-oriented database 106 is connected to the workstation 101 through a network 107 such as the Ethernet. A plurality of workstations each having a configuration similar to that of the workstation 101 shown in FIG. 1 can be connected through the network 107.

A floor control information to be controlled by the database 106 is divided broadly into a Floor information 108 and FloorPolicy information 109. The details of the information will be described later.

An application 110 is a typical example of an application which makes up the cooperation-type groupware system of this embodiment. A plurality of applications are actually operated on one or more workstations. In the application 110, there are the following four software modules and data structures relating to the floor control. Each of them will now be described.

FloorUnit 111

This is a data structure representing an application or a software module which is an object of the floor control. The floor control mechanism performs control of the FloorUnit 111 such as addition or deprivation of the floor. At least one FloorUnit 111 exists in each application to correspond to each one of the various floors in the application.

FloorSpace 112

A FloorSpace Representation 112 is a data structure representing a floor space which is a collection of the FloorUnit 111. In many cases, the FloorUnit 111 belongs to one or more FloorSpaces 112, and competes with other FloorUnits in the FloorSpaces 112 for the floor.

An entity of the FloorSpace 112 is controlled on the database 106 as the Floor information, and can be referred to from other applications which are operated in the system of this embodiment. The correspondence of the Floor information 108 and the FloorSpace 112 is controlled by a mechanism provided by the object-oriented database 106. By providing this control means on the application 110 side, the object-oriented database 106 can be replaced with a relational database or a mere secondary storage system. This point will be described in detail in a second embodiment.

FloorPolicy 113

A FloorPolicy 113 is invariably associated with a certain FloorSpace to define a floor control method in the FloorSpace. An entity of the FloorPolicy is controlled on the database 106 as the FloorPolicy information 109, and shared with other applications.

FloorPolicy Execution Module 114

A FloorPolicy execution module 114 is a software module for executing the floor control in the application 110 based on information held by the FloorUnit 111, FloorSpace 112 and FloorPolicy 113. The FloorPolicy execution module 114 of this embodiment calls a function (method) defined by the FloorPolicy 113.

In addition, incorporation is also achieved in which a policy is described on the FloorPolicy 113 with a script language such as TCL programming language (See "Tcl and the Tk Toolkit", John K. Ousterhout, Addison-Wesley, 1994 for the TCL programming language). In this case, the FloorPolicy execution module 114 is implemented as an interpreter for interpreting and executing the script provided by the FloorPolicy 113.

The FloorUnit, FloorSpace and FloorPolicy are used for constructing a model of the floor control. The floor control in this embodiment is executed based on the floor control model.

Figure 2:
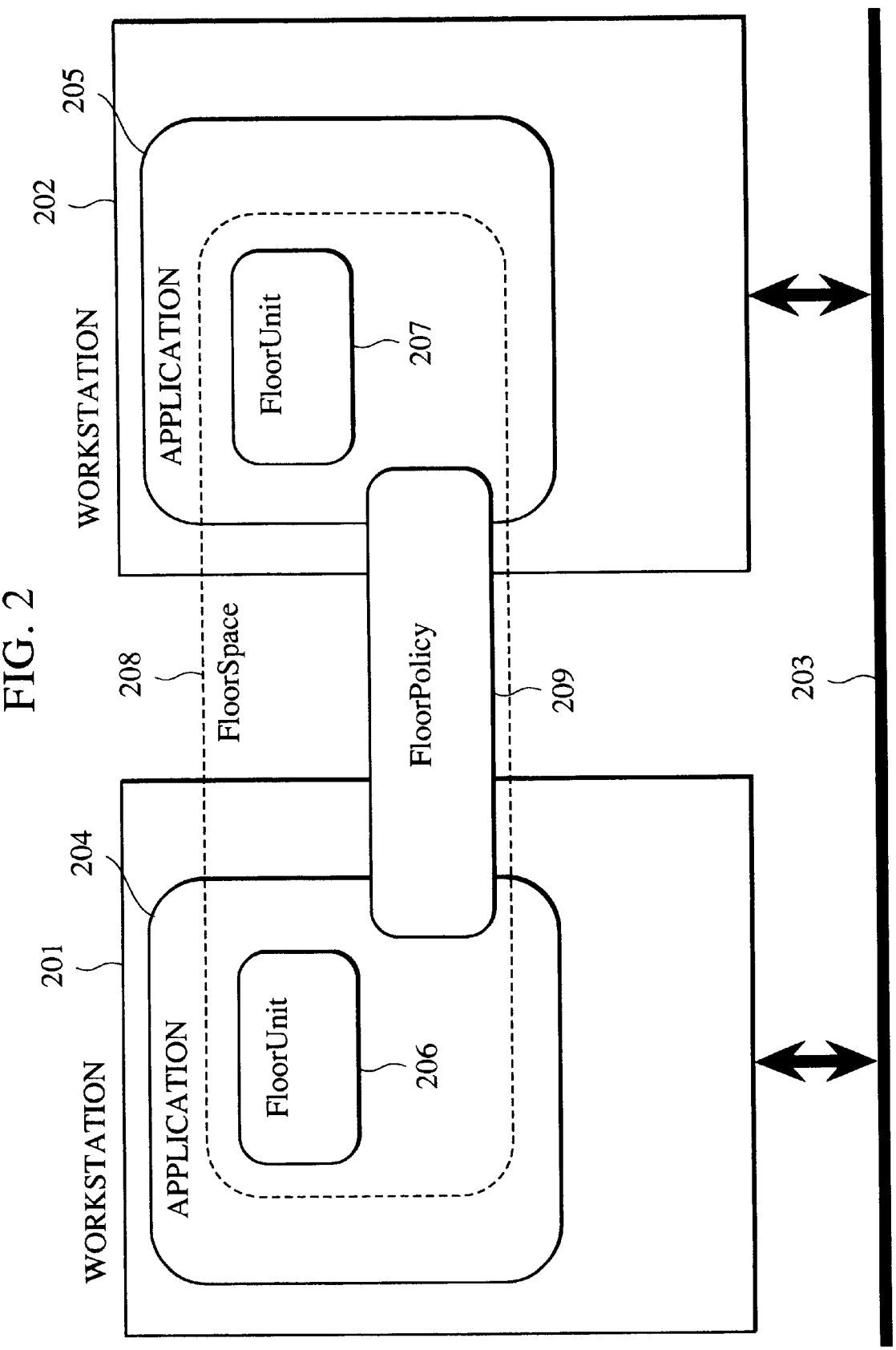
FIG. 2 illustrates a concept of a floor control model according to the first embodiment.

FIG. 2 illustrates a concept of the floor control model in this embodiment. Referring to FIG. 2, two workstations 201 and 202 are connected by an Ethernet cable 203, and applications 204 and 205 are operated thereon, respectively.

A FloorUnit 206 exists on the application 204, and a FloorUnit 207 exists on the application 205 to represent that each of the applications are candidates for floor acquisition. The FloorUnits 206 and 207 belong to the FloorSpace 208, and compete with each other for the floor. The floor control in the FloorSpace 208 is defined by the FloorPolicy 209.

Figure 3:
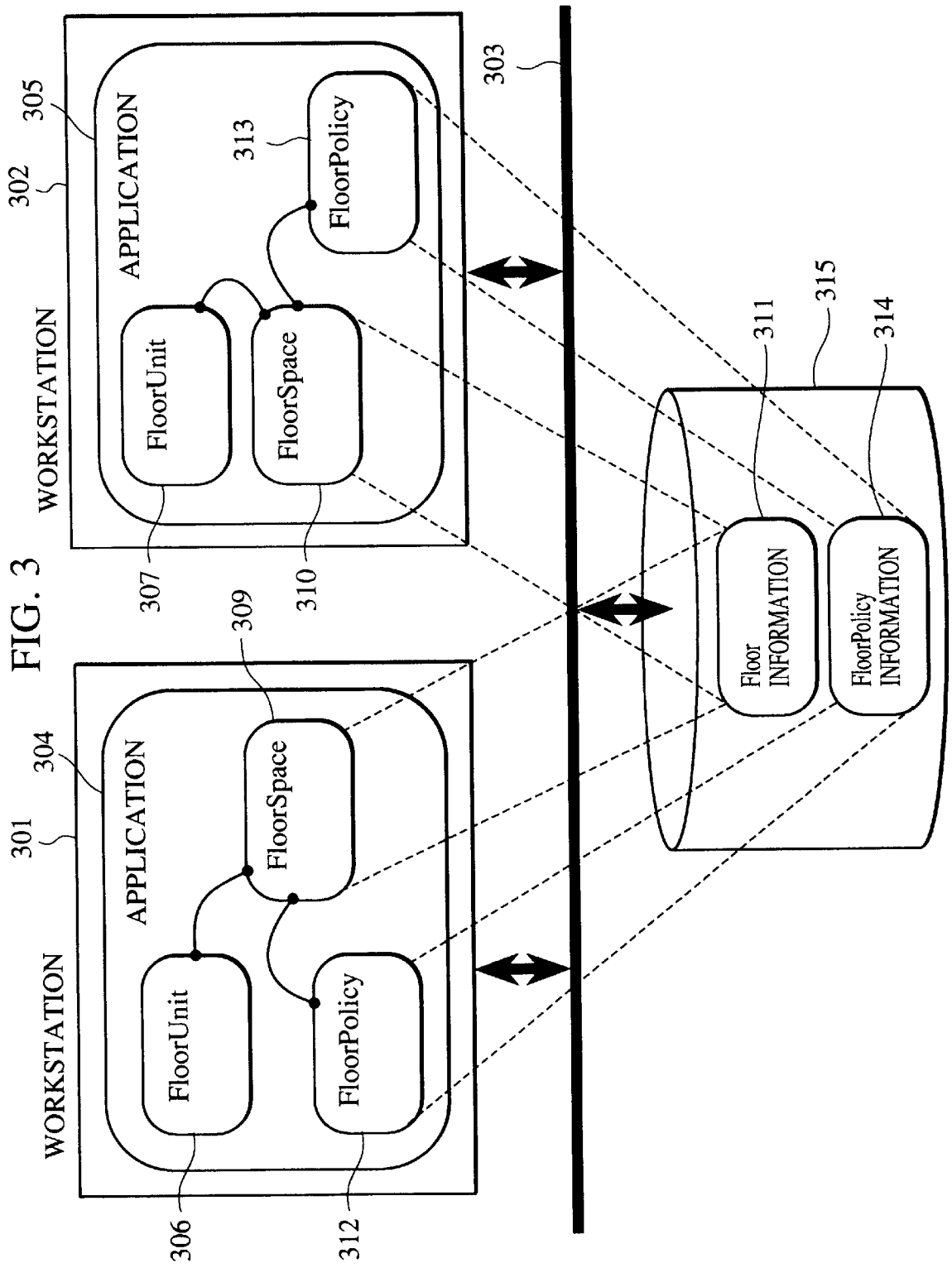
FIG. 3 illustrates a method for implementing the floor control model shown in FIG. 2.

FIG. 3 illustrates a method for implementing the floor control model shown in FIG. 2.

Referring to FIG. 3, each of the components 301 to 307 correspond to each of the components 201 to 207 in FIG. 2. In this drawing, an object-oriented database 315 is added for controlling a Floor information 311 and a FloorPolicy information 308 which are the data representing the FloorSpace 208 and FloorSpace 209 in FIG. 2.

The Floor information 311 and FloorPolicy information 314 are mapped by the object-oriented database 315 into data spaces of the applications 304 and 305. The information can be accessed and operated as a FloorSpace 309 and a FloorPolicy 312 in the data space of the application 304. Similarly, in the data space of the application 305, the information can be referred to and operated as a FloorSpace 310 and a FloorPolicy 313.

The results of operations performed on the FloorSpace and FloorPolicy of one application are reflected by the Floor information 311 and FloorPolicy information 314 on the database 315. Further, the results are reflected by the database 315 to the FloorSpace and FloorPolicy on the other application.

Data structures of the FloorUnit, FloorSpace and FloorPolicy will now be described. The data structures of the Floor information 311 and FloorPolicy information 314 in the object-oriented database 315 are not described here because they depend on incorporation of the object-oriented database 315. In many object-oriented databases, data structures in data spaces of applications are used as the data structures in the databases.

FloorUnit

As a data structure of C++ programming language, the FloorUnit is defined as follows (See "The Annotated C++ Reference Manual", Margaret A. Ellis etc., Addison-Wesley, 1990 for the C++ programming language):

```
class FloorUnit {
protected:
        int        type;
        char*      floorName;
        BOOL       isFloorHolder;
        FloorSpace* space;
        int             (*floorCallback)(int callback_type);
        int             (*errorCallback)(int callback_type);
public:
        int requestFloor();
        int releaseFloor();
};
```

In the above-described definition, "type" is information in the form of data for discriminating between the FloorUnit and the FloorSpace. This information is automatically specified when a FloorUnit data is produced. "isFloorHolder" is a variable which takes on TRUE as a value if the FloorUnit secures a floor, and takes on FALSE as a value if the FloorUnit does not secure the floor. A pointer to the FloorSpace to which the FloorUnit is belonging is registered in "space".

A pointer of the function specified by the application program is substituted into "floorCallback". This function is automatically called when the FloorUnit acquires and looses the floor. When the value of "callback_type" specified as a dummy argument of the floorCallback is 0, it represents floor acquisition. When the value of the callback_type is 1, it represents a loss of the floor.

A pointer of the function specified by the application program is substituted into "errorCallback". This function is automatically called when a processing such as floor acquisition in the FloorUnit causes errors. Similar to the "floorCallback", when the value of the callback_type is 0, it represents floor acquisition, and a loss of the floor when the value of the callback_type is 1.

In the FloorUnit, two methods of requestFloor( ) and releaseFloor( ) are defined. The method requestFloor( ) is a method which serves as an interface in which the application program acquires the floor. Conversely, the method releaseFloor( ) is a method which provides an interface in which the application program body releases the floor. Both of the methods return TRUE when the request is satisfied, and return FALSE when the request is not satisfied due to errors and the like.

With these methods, the FloorUnit provides an interface between the application program and the floor control mechanism. The application program utilizes the floor control mechanism in the following manner.

```
1   FloorUnit* a_floor_unit = new FloorUnit();
2   FloorSpace* a_floor_space = new FloorSpace("doSomething");
3   a_floor_space->addFloorUnit(a_floor_unit);
4   ...
5   if (a_floor_unit->requestFloor() ! = TRUE) {
6       // error
7       ...
8   } else {
9       // floor acquired. Perform a suitable processing
10      ...
11  }
```

On the first line, an instance of the FloorUnit is generated. Then, an instance of the FloorSpace is generated, and the FloorUnit is registered in the FloorSpace on the third line. "dosomething" on the second line which is provided when the FloorSpace instance is generated is the name (called floor name) assigned to the floor which is to be operated through the FloorSpace.

When the application performs an operation requiring the floor, floor acquisition is requested by the method requestFloor( ) as shown on the fifth line, and the application performs an operation only when succeeded in floor acquisition (on the ninth and tenth lines).

FloorSpace

The FloorSpace is defined as follows. Since the attribute of the FloorSpace is one to which some attributes of the FloorUnit are added, only the attribute to be added is described by utilizing a mechanism of C++ subclass.

```
class FloorSpace: public Floor Unit {
public:
        ListOf<FloorUnit>* floorUnitList;
        FloorPolicy*       policy;
        FloorUnit*         floorHolder;
public:
        FloorSpace(char* floorName);
        int addFloorUnit(FloorUnit* unit);
        int requestFloor(FloorUnit* unit);
        int releaseFloor(FloorUnit* unit);
};
```

In the above-described definition, "floorUnitList" is a list of the FloorUnit and FloorSpace, and represents an object of the floor control included in the FloorSpace. In the floorUnitList, not only the FloorUnit but also the FloorSpace can be handled as objects of the floor control. Thus, as described later, it is possible to form a hierarchical structure of FloorSpace so as to model a complicated floor control pattern.

"policy" is a pointer to the FloorPolicy defining the floor control in the FloorSpace. "floorHolder" is a pointer to the FloorUnit or FloorSpace holding the floor. The floorHolder invariably belongs to the floorUnitList.

The floor control requirements is modified by varying the values of "FloorPolicy* policy;". A means of the modification is implemented with a value variation mechanism provided by the C++ programming language.

In the FloorSpace, four methods of FloorSpace( ), addFloorUnit( ), requestFloor( ) and releaseFloor( ) are defined. The method requestFloor( ) is a method which serves as an interface in which the FloorUnit acquires the floor. Conversely, the method releaseFloor( ) is a method which provides an interface in which the FloorUnit releases the floor. The processing of the requestFloor( ) and releaseFloor( ) defined in the FloorUnit is implemented with the requestFloor( ) and releaseFloor( ) of the FloorSpace. Each of them return TRUE when the request is satisfied, and return FALSE when the request is not satisfied due to an error and the like. The method addFloorUnit( ), as described above, adds the FloorSpace and FloorUnit which are specified by the argument to the floorUnitList. The method FloorSpace( ) is a constructor called when the FloorSpace is generated, and takes on a floor name as the argument.

[FloorPolicy]
    The last FloorPolicy is defined as follows.
class FloorPolicy {
protected;
   char* policyName;
public:
   virtual int requestFloor(FloorUnit* unit, FloorSpace* space);
   virtual int releaseFloor(FloorUnit* unit, FloorSpace* space);
};

In the above-described definition, "policyName" is the name assigned to a floor control method represented by the FloorPolicy. The FloorPolicy has a method for controlling the floor. That is, the method requestFloor( ) is a method which defines an operation to a request for floor acquisition, and the method releaseFloor( ) is a method which defines an operation to a request for floor release. The methods of the same name defined in the FloorUnit and FloorSpace call requestFloor( ) and releaseFloor( ) which are finally defined in the FloorPolicy.

Many kinds of variations of the floor control methods (FloorPolicy) may be considered, and various pieces of information are necessary therefor. These policies are incorporated in the system of this embodiment by adding a suitable attribute to the FloorPolicy data structure and to override the requestFloor( ) and releaseFloor( ).

Figure 4:
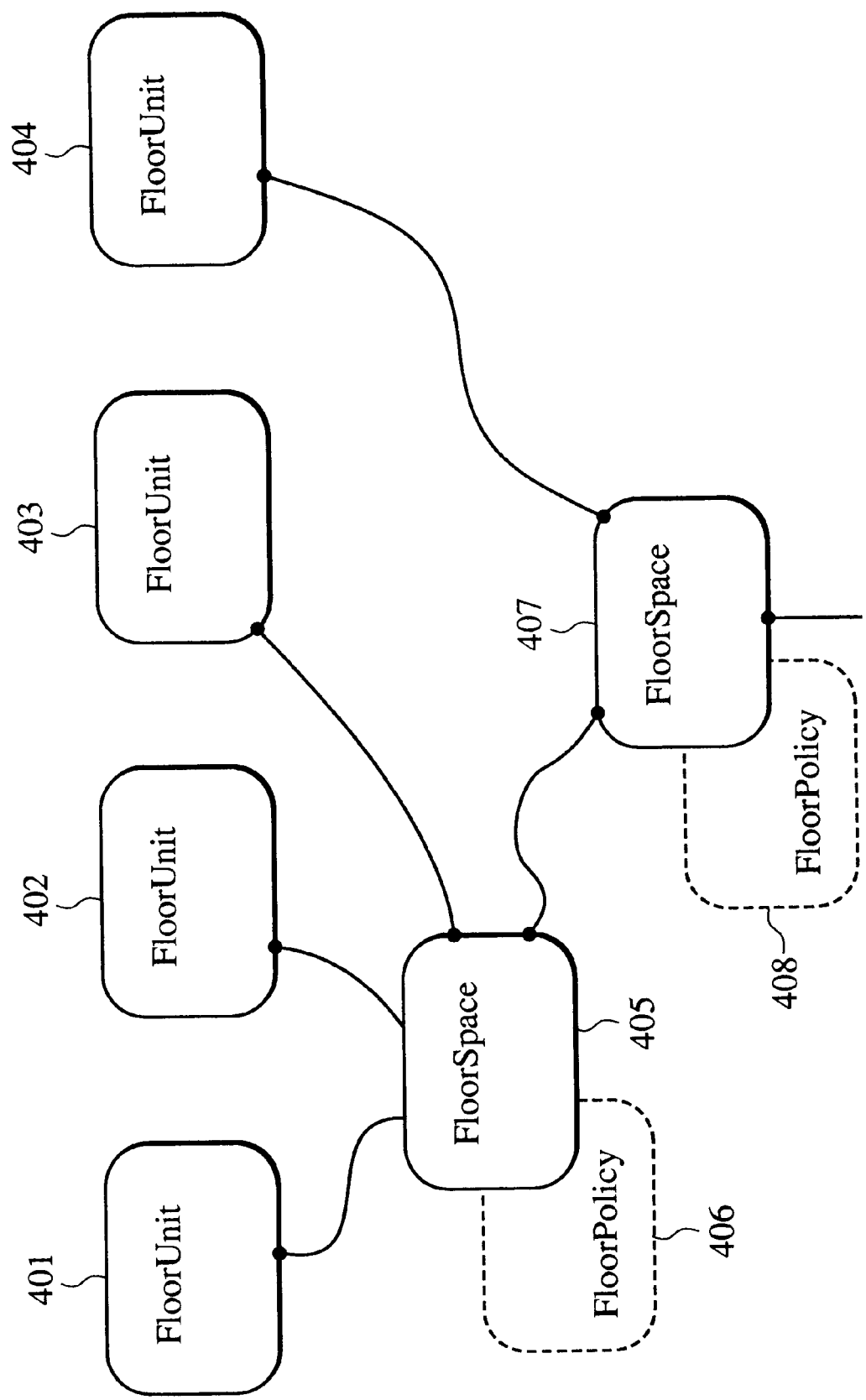
FIG. 4 illustrates hierarchical structures of FloorUnit and FloorSpace according to the first embodiment.

The FloorUnit, FloorSpace and FloorPolicy as defined above form a hierarchical structure shown in FIG. 4. Referring to FIG. 4, four FloorUnits 401, 402, 403 and 404 exist. FIG. 4 illustrates hierarchical structures of the FloorUnit and FloorSpace according to this embodiment.

Among them, the FloorUnits 401, 402 and 403 belong to the FloorSpace 405. The floor control in the FloorSpace 405 is controlled by the FloorPolicy 406. The FloorSpace 405 and FloorUnit 404 form the FloorSpace 407 so as to be controlled by the FloorPolicy 408.

The floor control in the entire hierarchical structure of the floor formed by a plurality of FloorSpaces shown in FIG. 4 is executed from a root of the hierarchical structure of the floor toward the FloorUnit in turn. This is because the lower FloorSpace (the FloorSpace nearer to the FloorUnit) acquires in turn the "floors" of the floor control in the upper FloorSpace (the FloorSpace nearer to the root of the hierarchical structure), and finally the floor control in the FloorUnit is executed.

Figure 5:
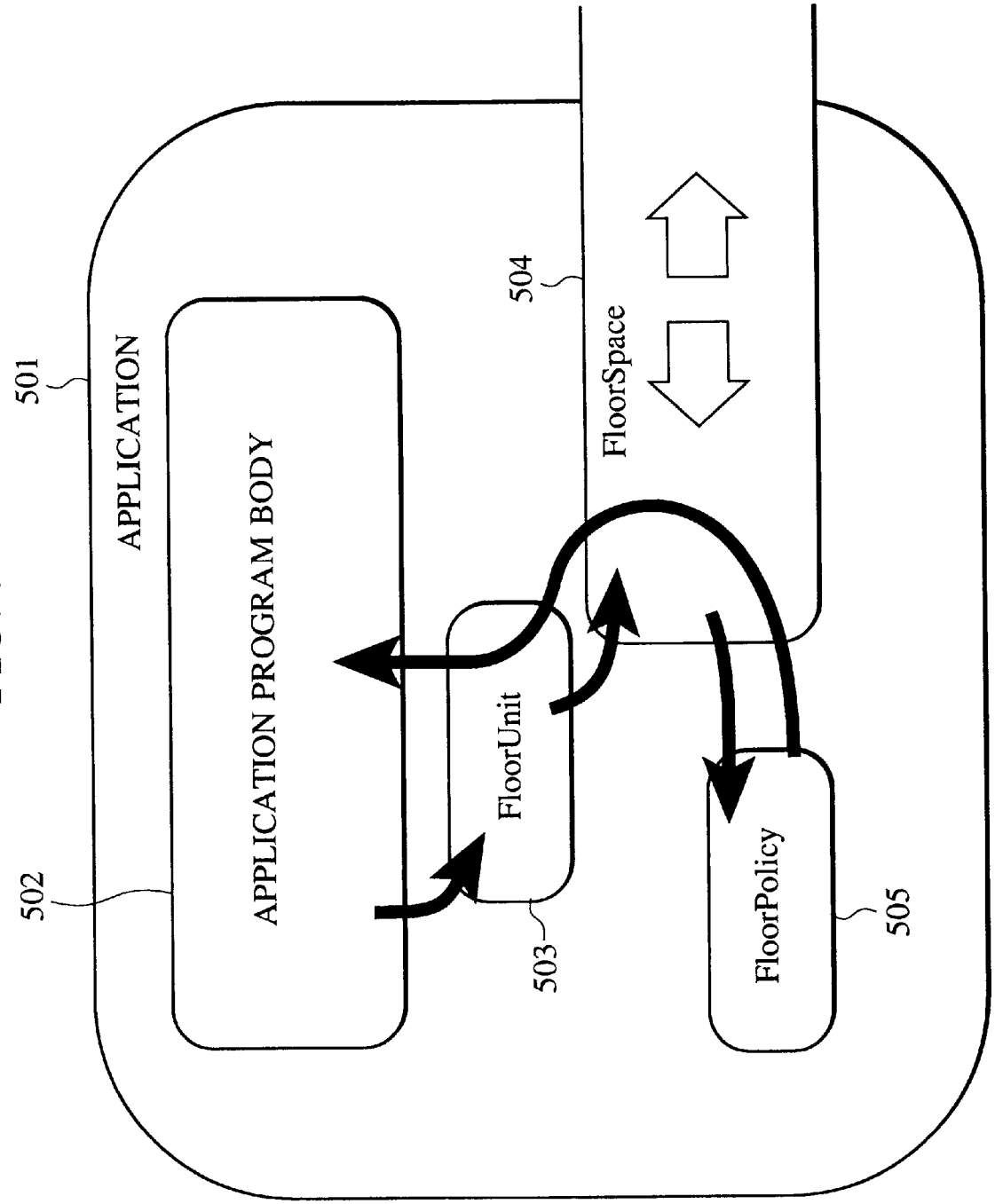
FIG. 5 illustrates a floor control according to the first embodiment.

How the floor control is executed in the data structure as described above will be described with reference to FIG. 5. FIG. 5 illustrates the floor control according to this embodiment. The processing to be herein described is represented by means of a flowchart in FIGS. 6 and 7. That is, FIG. 6 is a flowchart showing the floor control in the FloorUnit, and FIG. 7 is a flowchart showing the floor control in the FloorSpace.

Referring to FIG. 5, an application 501 can be divided into two modules: one is a floor control module including objects of a FloorUnit 503, FloorSpace 504 and FloorPolicy 505, the other is an application program body 502 which utilizes a service of the floor control module. The application body 502 is invariably associated with one or more FloorUnits 503. When performing the floor acquisition or floor release, the application body 502 calls the methods (requestFloor( ) and releaseFloor( )) of the FloorUnit 503 to present a request.

Figure 6:
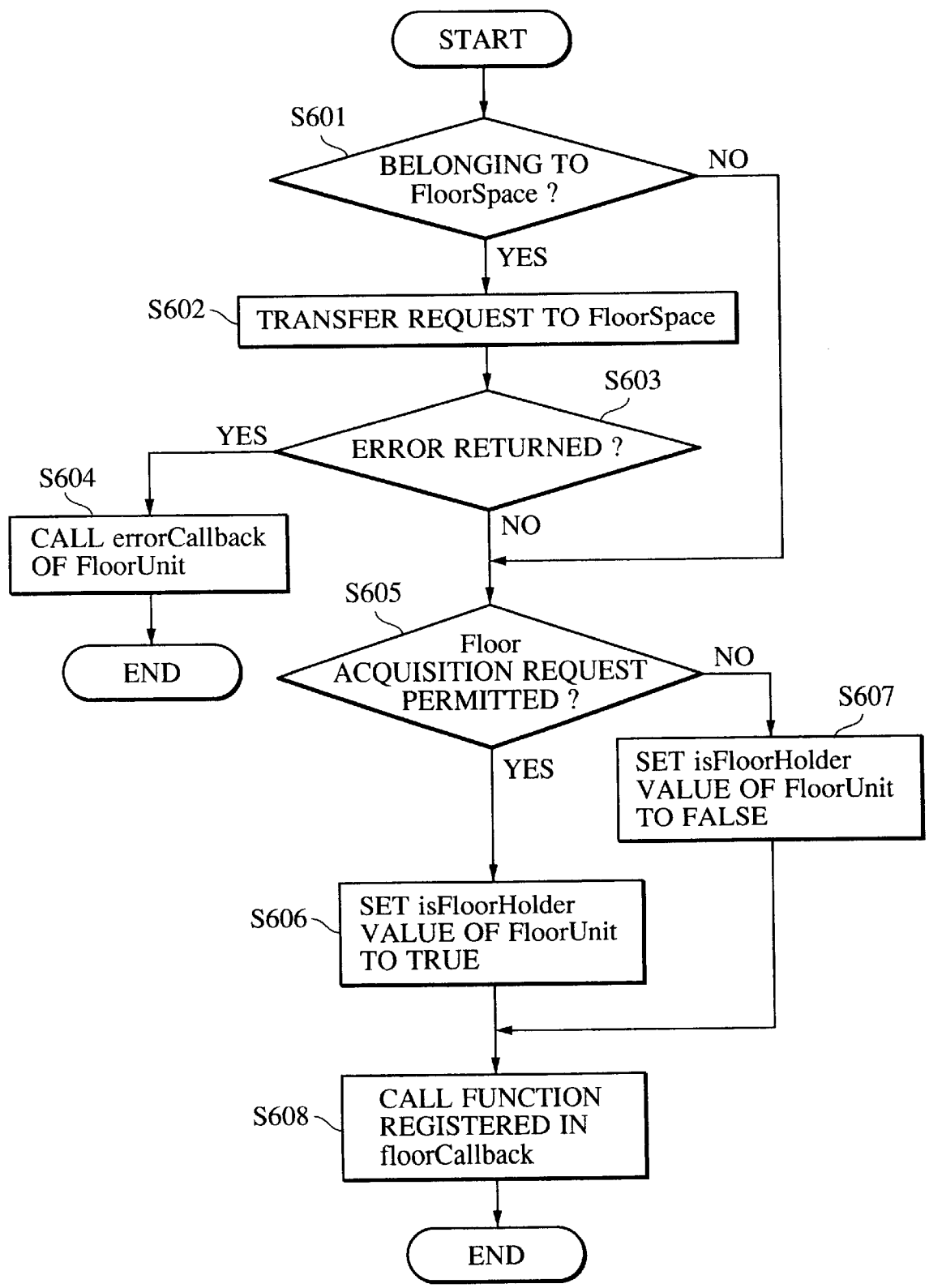
FIG. 6 is a flowchart showing the floor control in FlooUnit.
Figure 7:
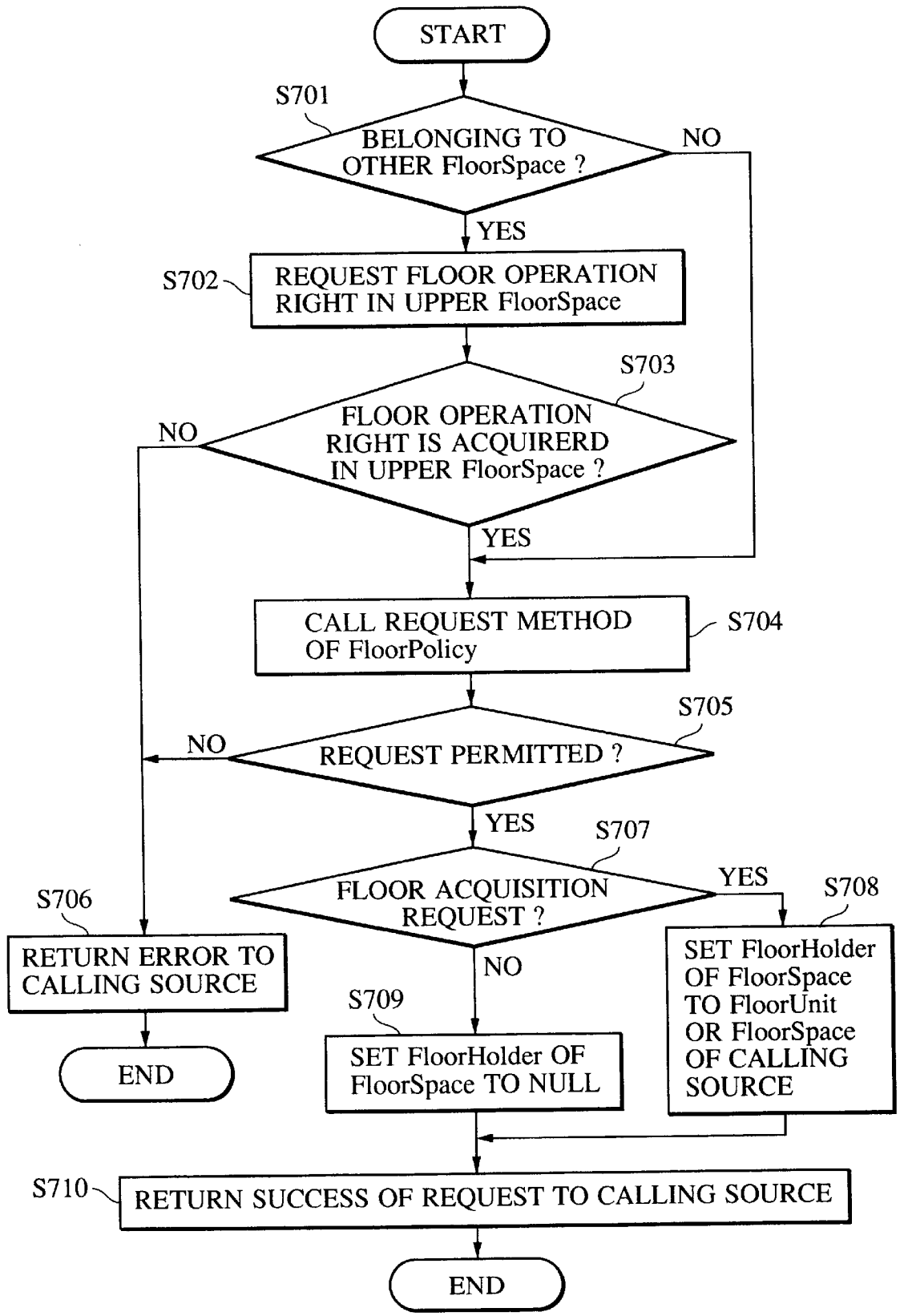
FIG. 7 is a flowchart showing the floor control in FloorSpace.

Upon receipt of the request, the FloorUnit checks whether the FloorUnit itself belongs to a certain FloorSpace (step S601 in FIG. 6). This is judged by the fact whether or not a value of a space attribute of the FloorUnit is NULL. When the value is NULL, the FloorUnit does not belong to any FloorSpace, and there is no need to compete with other FloorUnit for the floor. Thus, the processing of the floor control for acquiring/releasing the floor in the FloorUnit shown in step S605 and thereafter is performed immediately.

When it is checked in step S601 that the value of the space attribute of the FloorUnit 503 is not NULL, the request is transferred to the FloorSpace 504 by calling the method of the same name in the FloorSpace (step S602).

When the floor control performed in the FloorSpace 504 based on the above request is completed, the result thereof is returned to the FloorUnit 503. Consequently, when the request is unsuccessful and not permitted, the value of "isFloorHolder" is not modified and a function registered in the errorCallback is called (steps S603 and S604).

When the request is permitted, i.e. when the processing of the FloorSpace in step S603 based on the request of step S602 is successful, or when the FloorUnit does not belong to a certain FloorSpace in step S601, the procedure advances to step S605. If the floor acquisition request is permitted in step S605, the value of the isFloorHolder of the FloorUnit is set to TRUE (step S606). If not permitted, the value of the isFloorHolder is set to FALSE (step S607). Then, a function registered in the floorCallback is called (step S608) to end the processing.

The floor control in the FloorSpace 504 called in step S602 will be described with reference to FIG. 7.

Upon receipt of the request, the FloorSpace 504 checks whether the FloorUnit 504 itself belongs to other FloorSpace (step S701). This is judged by the fact whether or not a value of a space attribute is NULL, as in the case of the FloorUnit. When the value is NULL, the FloorSpace 504 does not belong to other FloorSpace, and there is no need to compete with other FloorUnit and FloorSpace for the floor. Thus, the processing of the floor control for acquiring/releasing in the FloorSpace shown in step S704 and thereafter is performed immediately.

When it is checked in step S701 that the value of the space attribute of the FloorSpace 504 is not NULL, a floor operation right in the upper FloorSpace is requested by calling the method of the same name in the upper FloorSpace which is the value of the space attribute (step S702). The floor control processing performed by the upper FloorSpace based on the request is executed exactly like the processing shown by the flowchart of FIG. 7. The difference between the floor control processing performed by the upper FloorSpace and the processing in the FloorSpace 504 is absorbed by the FloorPolicy associated with the upper FloorSpace.

When the FloorSpace 504 fails to acquire the floor operation right in the upper FloorSpace, it returns the error to the FloorUnit 503 which is an issuing source of the request (steps S703 and S706). As described above, the FloorUnit 503 performs an error processing by means of steps S603 and S604 upon receipt of an error notice.

On the other hand, when succeeding in acquiring the floor operation right in the upper FloorSpace, the FloorSpace 504 asks the FloorPolicy registered in the policy attribute to execute the request from the FloorUnit. This processing is executed by calling the requestFloor( ) method or releaseFloor( ) method of the FloorPolicy (step S704).

Then, the FloorPolicy 505 judges whether or not the request is executed based on the attribution values of the FloorUnit 503 and FloorSpace 504 or FloorPolicy 505 itself specified as arguments, and returns the result to the FloorSpace 504.

When the request performed by the FloorSpace 504 is determined to be erroneous and not permitted, the FloorSpace 504 returns the error to the FloorUnit 503 which is an issuing source of the request (steps S705 and S706). For example, when the FloorUnit which has already acquired the floor requests for acquiring the floor, or when the FloorUnit which does not acquire the floor requests for releasing the floor, the request may be determined to be erroneous. However, the operation thereof varies with the floor control method implemented by the FloorPolicy.

On the other hand, when the request is permitted in step S705, the FloorSpace 504 receives the result, and modifies the value of floorHolder attribute based on the result. If the request is the floor acquisition request, a pointer of the FloorUnit 503 which issued the request is substituted into the floorHolder (steps S707 and S708). If the request is the floor release request, the value of the floorHolder is set to NULL (steps S707 and S709).

When the floor control in the FloorSpace 504 is completed, the result thereof is returned to the FloorUnit 503 (step S710).

As described above, the first embodiment constitutes an embodiment of the present invention with the use of the floor control mechanism in the groupware system. That is, according to the first embodiment, "floor unit", "floor space" and "floor policy" are introduced by defining them as FloorUnit, FloorSpace and FloorPolicy of C++ class with the use of object-oriented database, and the FloorUnit, FloorSpace and FloorPolicy have allowed a configuration and structure of the "floor space" to be modeled.

According to the first embodiment, incorporation of a consistent floor control mechanism into an existing application has become possible by implementing and providing the floor control mechanism as the C++ class which can be incorporated into an application operated on the groupware system.

In addition, since the configuration and structure of "floor space" can be modified by a pointer operation of C++ objects, the floor control method can respond to dynamic changes in a work environment due to frequent users' participation and removal in the groupware system and start and end of the applications associated therewith.

Second Embodiment

An embodiment of the present invention in the cooperation-type groupware system is described in the first embodiment. An embodiment according to another configuration shown below will be described in this second embodiment.

Figure 8:
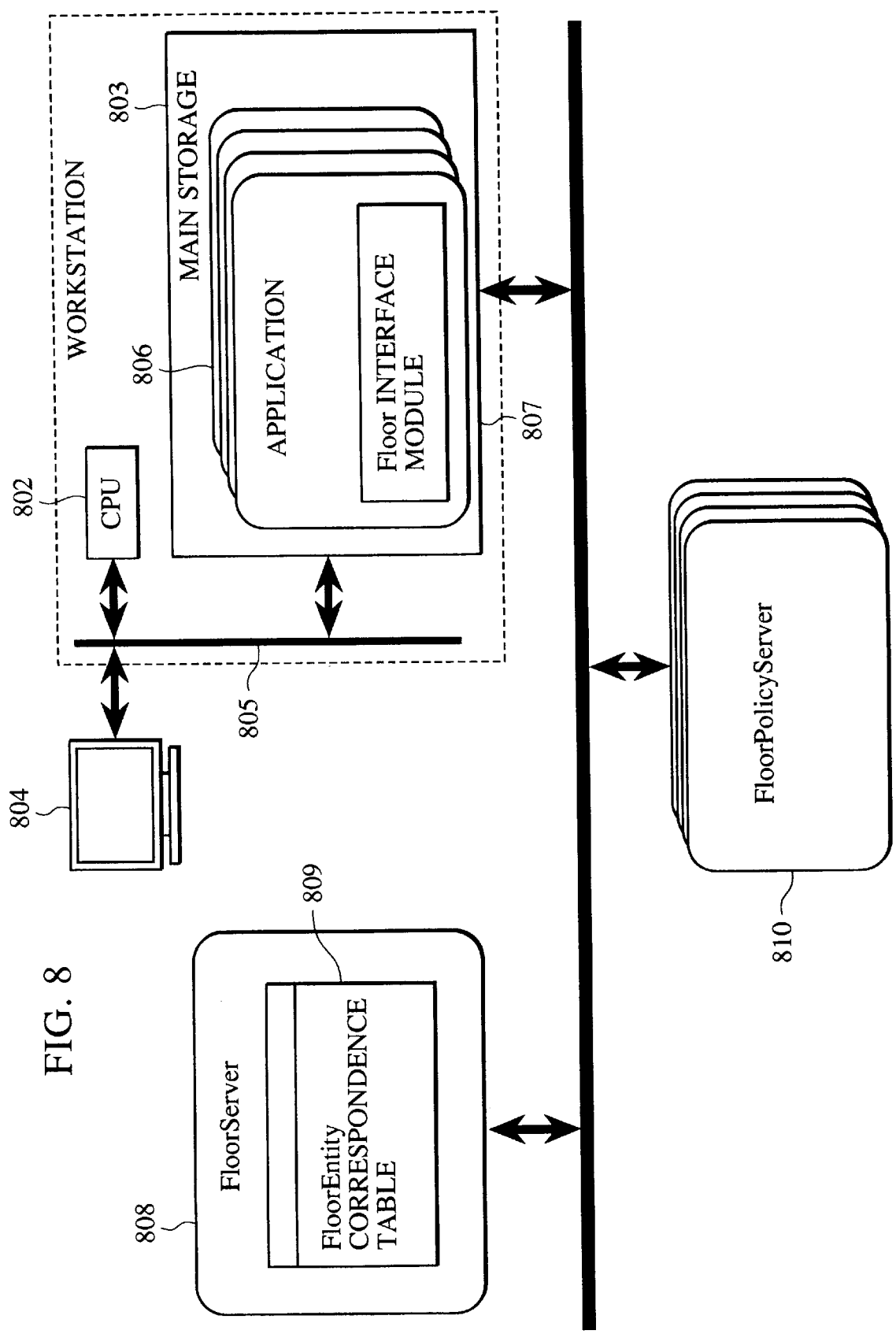
FIG. 8 illustrates a configuration of a floor control mechanism in a groupware system according to the third embodiment of the present invention.

FIG. 8 illustrates a configuration of a floor control mechanism in a groupware system of the second embodiment. Referring to FIG. 8, a workstation 801 consists of a CPU 802 for executing a processing of this embodiment, and a main storage 803 for holding applications constituting cooperation-type groupware of this embodiment. The CPU 802 and the main storage 803 are connected by a computer bus 805. A display 804 is also connected to the workstation 801 by the computer bus 805.

In this embodiment, the floor control mechanism is implemented as a FloorServer 808 and FloorPolicyServers 810 separated from the application 806.

The FloorServer 808 corresponds to the FloorUnit 111 and FloorSpace 112 in FIG. 1, and controls the floor information and FloorPolicyServers, which is described later. The FloorServer 808 includes therein a FloorEntity correspondence table 809 which corresponds to the FloorUnit and FloorSpace in the first embodiment. The FloorEntity correspondence table 809 will be also described later.

The FloorPolicyServers 810 correspond to the FloorPolicy 113 and FloorPolicy execution module 114 in FIG. 1. One server implements one or several types of floor control methods, and executes the floor control based on a request of the FloorServer 808.

Each of the FloorPolicyServers 810 process at least the following remote messages (sent from the FloorServer):

requestFloor <FloorEntity Name 1><FloorEntity Name 2> releaseFloor <FloorEntity Name 1><FloorEntity Name 2>.

These remote messages have approximately the same meanings as the methods of the same name defined in the FloorPolicy of the first embodiment.

That is, "requestFloor" is the remote message which requests for acquiring the floor in the FloorEntity 2 of the specified FloorEntity 1, and "releaseFloor" is the remote message requesting for releasing the in the FloorEntity 2 of the specified FloorEntity 1.

Although the FloorServer 808 and the FloorPolicyServers 810 can be operated on the workstation 801, they can be also operated on another workstation having the same configuration as that of the workstation 801.

The application 806 performs the floor control by utilizing services of the FloorServer 808 through a floor interface module 807.

Figure 9:
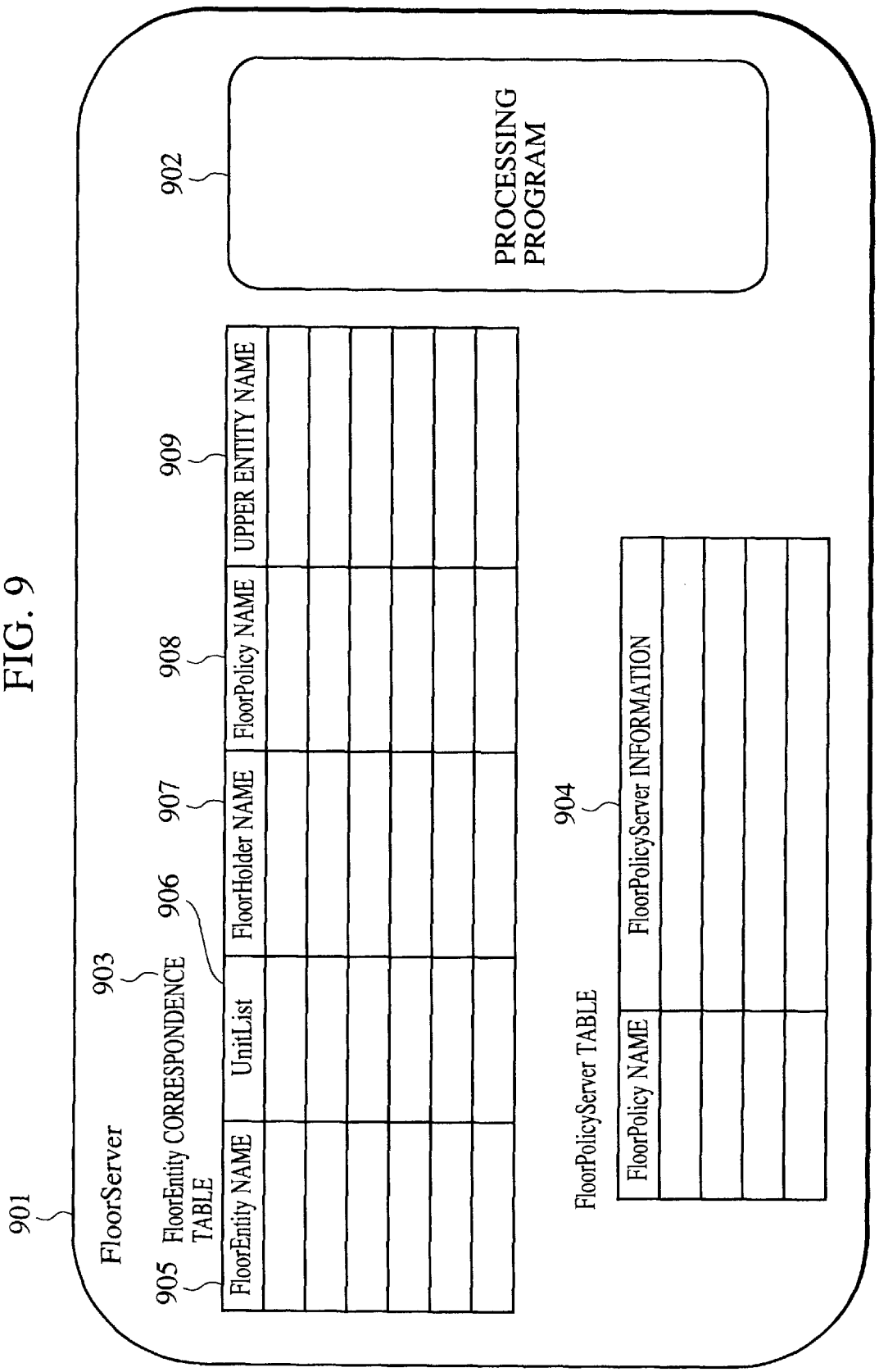
FIG. 9 illustrates an internal structure of a floor server.

The FloorServer 808 will now be described. FIG. 9 illustrates an internal structure of a FloorServer. Referring to FIG. 9, a FloorServer 901 includes a processing program 902, a FloorEntity correspondence table 903 and a FloorPolicyServer table 904. In this embodiment, the hierarchy of the FloorUnit and FloorSpace represented by data access relation, as shown in FIG. 4 of the first embodiment is controlled by the FloorEntity correspondence table 903. The FloorEntity correspondence table 903 includes the following five attributes:

FloorEntity Name 905

UnitList 906

FloorHolder Name 907

FloorPolicy Name 908 and

UpperEntity Name 909.

Each of the attributes can be corresponded to the attributes of the data structures of the FloorUnit and FloorSpace. Each of the attributes will now be described.

FloorEntity Name 905

A FloorEntity is a general term for the FloorUnit and FloorSpace. Each of the rows (called a "tuple") in the FloorEntity correspondence table 903 represent one FloorEntity. The FloorEntity Name 905 is the unique name assigned to each FloorEntity represented by each tuple, and is specified when the tuple is generated. The FloorEntity Name 905 is used as a main key in retrieval of tuples.

Unitlist 906

The UnitList 906 is the list of the name of the lower FloorEntity included in the FloorEntity. The FloorEntity in which the UnitList 906 is null corresponds to the FloorUnit in the first embodiment, and other Floor Entity corresponds to the FloorSpace.

FloorHolder Name 907

The FloorHolder name 907 controls the name of the FloorEntity which secures the floor at present among the FloorEntities contained in the UnitList 906. Since the FloorHolder Name 907 can register therein a plurality of FloorEntity names, it can respond to a model in which a plurality of applications can exist in one floor space, unlike the floor model provided by the FloorUnit n the first embodiment.

FloorPolicy Name 908

The FloorPolicy name 908 is the name of the FloorPolicyServer which executes the floor control in the FloorEntity. This name is used as a main key of the FloorPolicyServer table 904 to acquire necessary information for communicating with the FloorPolicyServer. In this embodiment, the FloorUnit and FloorSpace can be handled without discrimination by specifying the FloorEntity name to the floor entity which corresponds to the FloorUnit.

Upper Entity Name 909

The last Upper Entity name 909 is the name of the upper FloorEntity including the FloorEntity itself in the UnitList. By this attribute, a floor model similar to that shown in FIG. 4 can be formed. In this embodiment, since a plurality of names of the upper entities can be registered in the Upper Entity name 909 unlike a floor model in the first embodiment, it is possible to represent FloorEntities belonging to a plurality of floor spaces.

The FloorServer 901 provides the following remote massage interfaces for referring to and changing the above-described FloorEntity correspondence table 903:

addFloorEntity<FloorEntity Name><UnitList><FloorPolicy Name><Upper Entity Name> removeFloorEntity<FloorEntity Name> findFloorEntity<FloorEntity name>

"addFloorEntity" is the message for generating floor entity and adding it to the FloorEntity correspondence table 903. A value other than the FloorHolder name is specified as an argument. The FloorHolder name is invariably null when the FloorEntity is generated. Conversely, "removeFloorEntity" is the message which specifies the FloorEntity name and removes the entity from the FloorEntity correspondence table 903. "findFloorEntity" is the massage which requests for acquisition of all values of the specified FloorEntities.

In this embodiment, the floor control requirements are modified by varying the FloorPolicy name in the FloorEntity correspondence table. A means of modification is provided by the addFloorEntity and removeFloorEntity.

An arbitrary application program can modify the floor hierarchy shown in FIG. 4 dynamically by utilizing these interfaces. Further, a suitable floor control can be applied to the floor hierarchy modification.

A FloorPolicyServer table 904 is, as described above, the table for controlling information of ports required for communication using the FloorPolicy name 908 as a main key. This table is accessed when a data communication with the FloorPolicyServer is required for the floor control processing.

The FloorServer 901 also provides interfaces for accessing and modifying the FloorPolicyServer table 904 as in the case of the FloorEntity correspondence table 903. In order to incorporate a new floor control system, a FloorPolicyServer in which the floor control system is incorporated may be prepared and registered in the FloorPolicyServer table 904.

Figure 10:
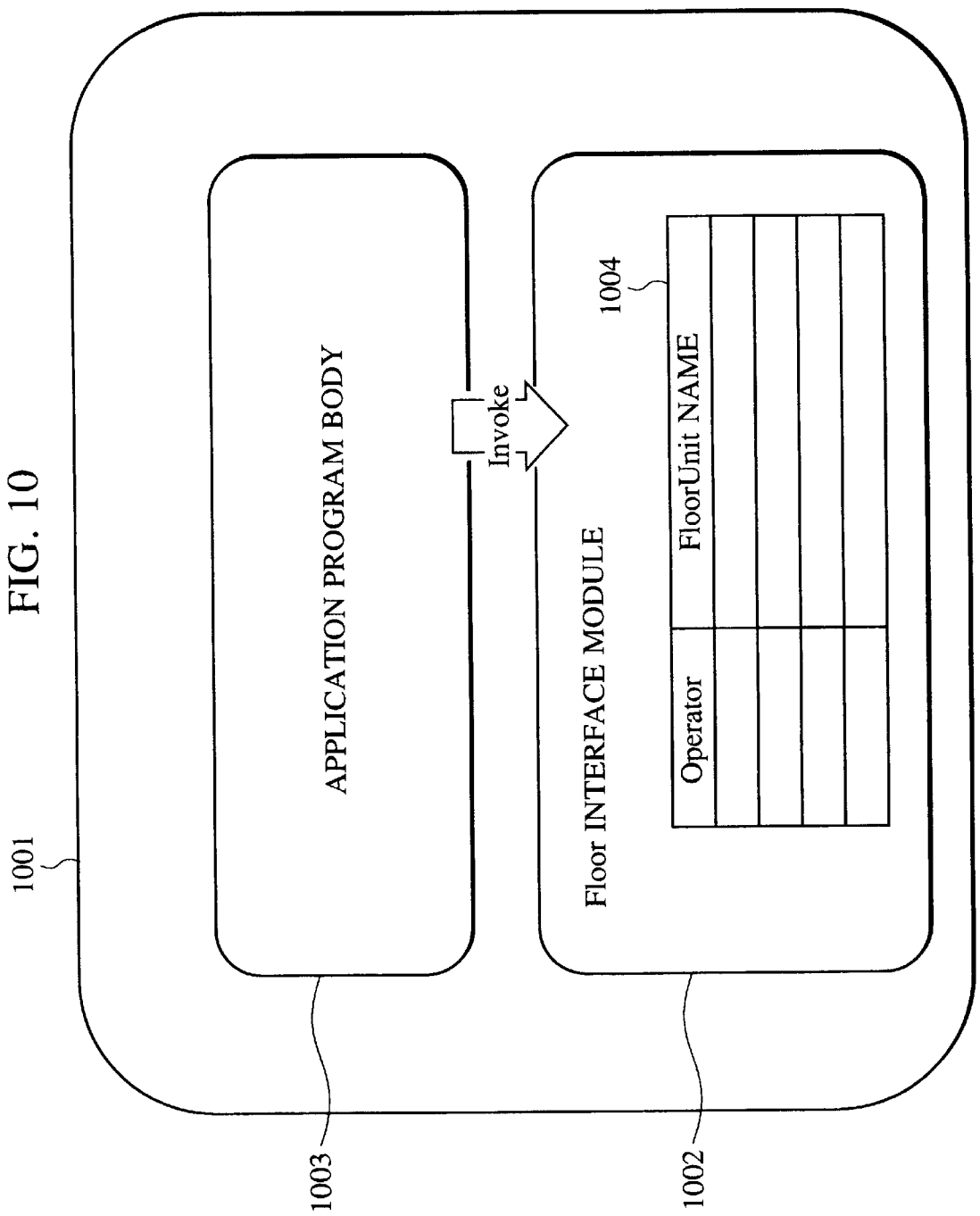
FIG. 10 schematically illustrates a floor interface module in an application.

FIG. 10 schematically illustrates a floor interface module in an application. As shown in FIG. 10, a general application 1001 can be divided into a floor interface module 1002 providing interfaces of the floor control and an application program body 1003.

The floor interface module 1002 according to this embodiment is mainly comprised of a several function prepared by C programming language to be described later, and a Floor Trigger table 1004. In utilizing services of the floor interface module 1002, according to the first embodiment, the application program body presents a request clearly to the FloorUnit so as to perform the floor control. In this embodiment, however, a different utilization mechanism of the floor control is provided.

That is, a programmer defines a processing for which the floor control is required as a function of the following type:

typedef int (*operator_t)( );

and registers the function in the floor interface module 1002 with the function to be represented as follows which is provided by the floor interface 1002:

int RegisterOperation(char* floorName, operator_t anOperation);

wherein "floorName" is the name assigned to the floor of the floor control in which the anOperation to be registered is an object. The floor name "floorName" and the function pointer anOperation registered in RegisterOperation( ) are added into the Floor Trigger table 1004. The main key of this table is a value of the function pointer anOperation (i.e. address).

In this embodiment, the floor control is automatically performed when the function registered in RegisterOperation( ) is called, and whether or not the called function can be executed is decided. The interfaces described herein can, of course, be implemented similarly in the first embodiment.

In order to implement a mechanism which automatically executes the floor control when the registered function is called, the following two mounting methods can be adopted.

1) A function "invoke( )" for calling the function only is prepared by the floor interface module 1002 so that the function which executes the floor control is invariably called through the function invoke( ). The function invoke( ) is defined as follows.

void* invoke(operator_t anOperation, char* argDescription, . . . );

In the above definition, "anOperation" is an address of the function to be called, and "argDescription" is information in the form of an argument which is to be passed to the anOperation. The function invoke( ) performs the floor control before the function specified by the anOperation is executed, and executes the anOperation only when the floor is acquired.

The function calling due to the function invoke( ) can be automatically generated by the use of prior art such as a preprocessor and a macro without being specified by a programmer.

2) A trapping mechanism of the function calling provided by an operating system, or a client library of an object-oriented database, is utilized. The trapping mechanism is implemented by the prior art such as swizzling and exception handling, and can be utilized in some commercial systems (See "Object data management: object-oriented and extended relational database systems", R. G. G. Cattell, Addison-Weslay, 1991 for swizzling and exception handling).

In this embodiment, a description will be given based on the above method 1). However, this description can be applied as it is to the method 2).

Figure 11:
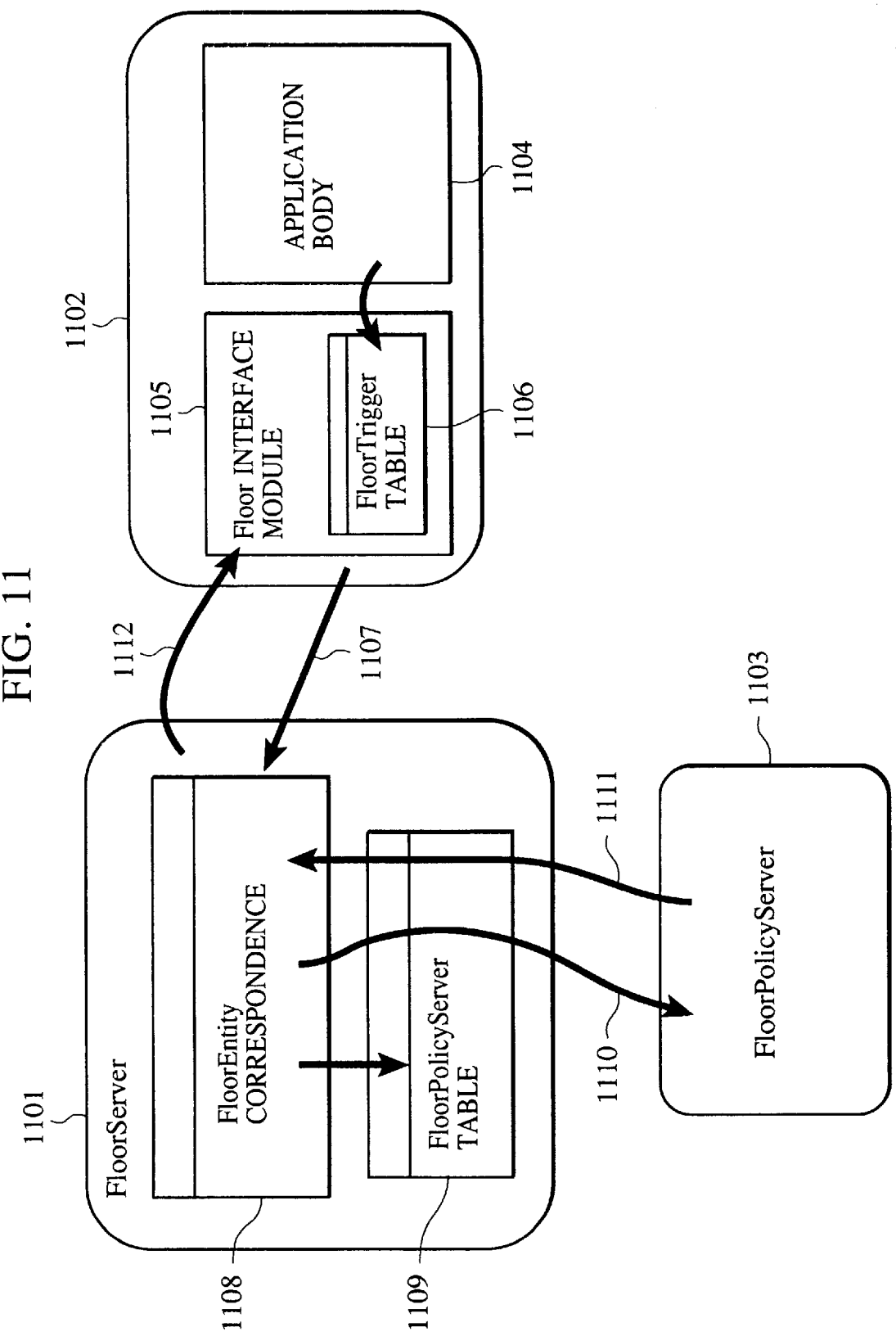
FIG. 11 illustrates a floor control according to the second embodiment.
Figure 12:
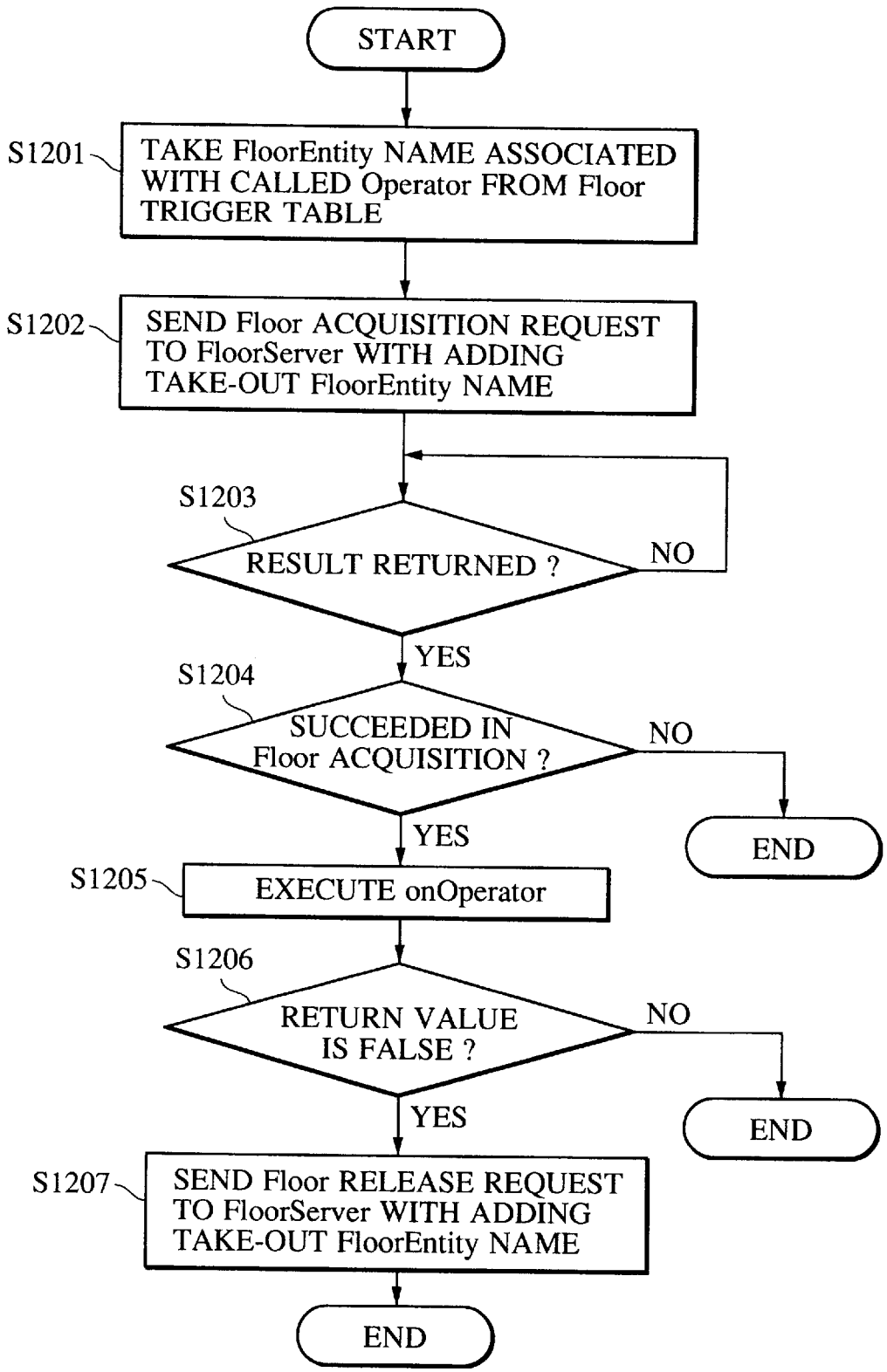
FIG. 12 is a flowchart showing the operation of an application 1102 in FIG. 11.
Figure 13A:
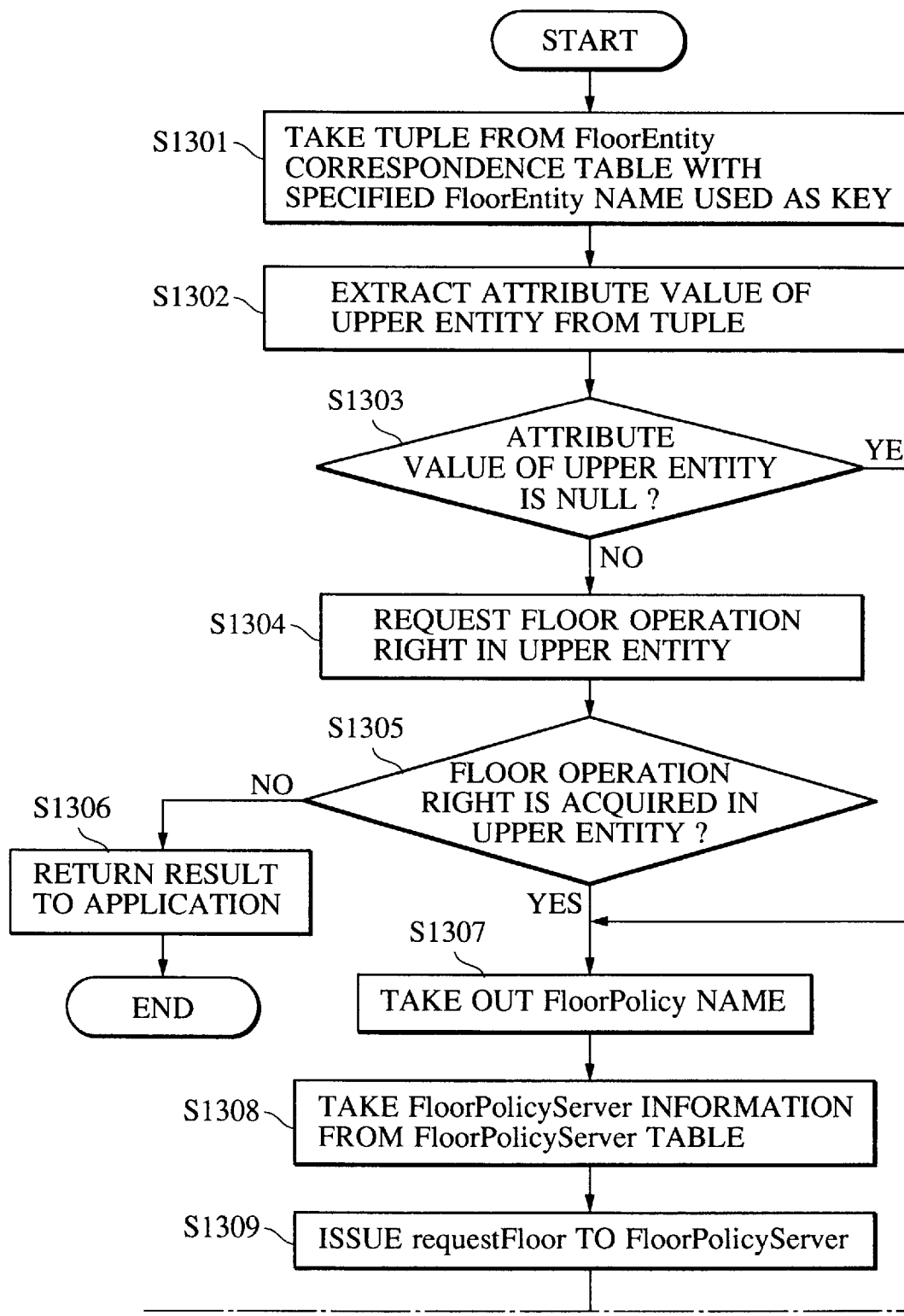
FIG. 13, consisting of FIGS. 13A and 13B, is a flowchart showing the operation of FloorServer 1101 in FIG. 11.
Figure 14:
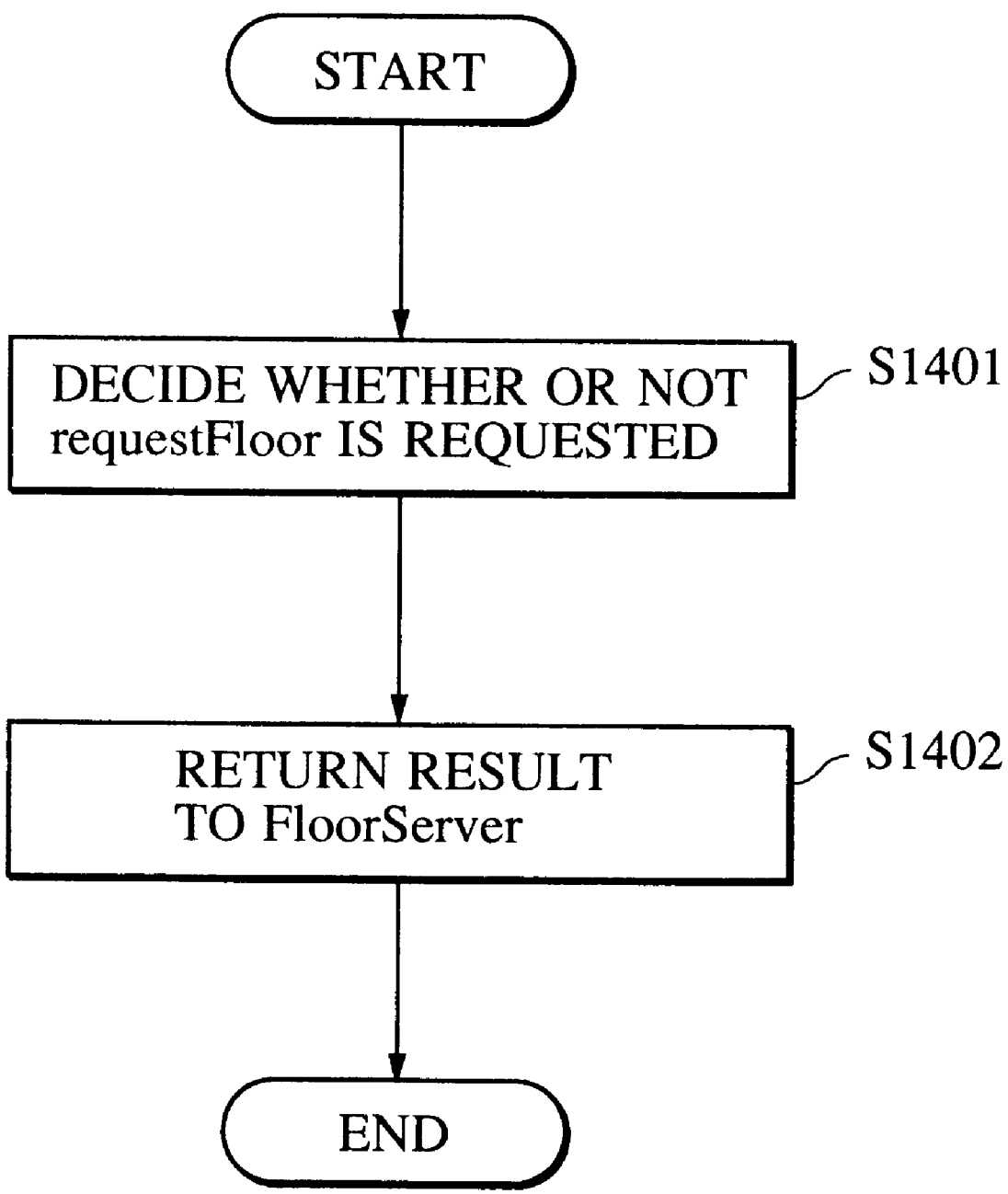
FIG. 14 is a flowchart showing the operation of FloorPolicyServer 1103 in FIG. 11.

The flow of a floor control started by the function invoke( ) will now be described with reference to FIG. 11. FIG. 11 illustrates a floor control according to this embodiment. FIG. 12 is a flowchart showing the operation of an application 1102 in FIG. 11; FIG. 13 is a flowchart showing an operation of a FloorServer 1101; and FIG. 14 is a flowchart showing the operation of a FloorPolicyServer 1103.

Referring to FIG. 11, the FloorServer 1101, application 1102 and FloorPolicyServer 1103 are operated in conjunction with one to the other. When the invoke( ) function of a floor interface module 1105 is called by an application body 1104 within the application 1102, the floor interface module 1105 takes the corresponding FloorEntity name from a floor trigger table 1106 with the address of the function specified as the argument of the invoke( ) used as a key (step S1201). Then, the floor interface module 1105 issues a floor acquisition request 1107 represented by the taken-out FloorEntity name to the FloorServer 1101 (step S1202). Thereafter, the application 1102 waits until the result is returned thereto (step S1203).

When the result of floor acquisition request processing executed by the FloorServer 1101 is returned, the procedure advances to step S1204. When the floor acquisition request is permitted, the floor interface module 1105 calls the anOperation specified by the invoke( ) to execute the processing specified by the application body 1104 (step S1205). When the floor acquisition request is refused, the function invoke( ) terminates the processing without calling the anOperation.

After completion of executing the anOperation, a processing in relation to a floor release request is performed. That is when a return value of the anOperation is FALSE, the procedure advances from step S1206 to step S1207 in which the floor interface module 1105 issues the floor release request to the FloorServer 1101. The flow of the processing of the floor release request is substantially same as that of the processing of the floor acquisition request. The differences therebetween will be described later. When all of the processing of the floor release request are completed, the invoke( ) terminates the processing regardless of whether the request is executed. When the return value of the anOperation is TRUE, the invoke( ) terminates the processing immediately without performing the floor release request processing.

How the FloorServer 1101 processes the floor acquisition request 1107 sent from the application 1102 by the processing of step S1202 will now be described with reference to the flowchart of FIG. 13.

Upon receipt of the floor acquisition request 1107, the FloorServer 1101 takes a tuple from the FloorEntity correspondence table 1108 with the specified FloorEntity name used as a key (step S1301), and then extracts the upper entity therefrom (step S1302). When a suitable FloorEntity name is specified in the upper entity name, acquisition of the floor operation right is requested to the upper entity in order to acquire the floor operation right on the upper entity name (steps S1303 and S1304). In order to acquire the floor operation right, the procedures described herein (from step S1301 to step S1313) are repeated until a FloorEntity in which the upper entity name is null is found. On the other hand, when the upper entity name is null without being specified by a suitable FloorEntity name in step S1303, the procedure advances to step S1307 so that the floor operation right can be acquired unconditionally to continue the processing.

However, when failing to acquire the floor operation right in the upper entity, the procedure advances from step S1305 to step S1306 to return the result to the application 1102, and then the FloorServer 1101 terminates the processing.

When the upper entity is not specified in step S1303, or when the floor operation right in the upper entity name is acquired in step S1305, the procedure advances to step S1307 to extract a FloorPolicy name from a tuple. Further, the FloorPolicy name is used as a key of the FloorPolicyServer table 1109 to take out information such as port numbers and sockets which are required for communicating with the FloorPolicyServer 1103 (step S1308). When the information enables the communication with the FloorPolicyServer 1103, the FloorServer 1101 adds the FloorEntity name to the upper entity name to issue a requestFloor request to the FloorPolicyServer 1103 (step S1309). Thereafter, the FloorServer 1101 waits until the result is returned thereto (step S1310).

When the result of the floor acquisition request processing executed by the FloorPolicyServer 1103 is returned, the procedure advances from step S1310 to step S1311. In step S1311, when the floor acquisition request is permitted by the FloorPolicyServer 1103, the FloorAcquisitor name included in the upper entity in the FloorEntity correspondence table 1108 is modified to the FloorEntity name which has issued the request (step S1312). On the other hand, when the floor acquisition request is not permitted by the FloorPolicyServer 1103 in step S1311, the FloorEntity correspondence table 1108 is not modified.

When the above-described processing in the FloorServer 1101 is completed, a result 1112 is further transferred to the application 1102 (step S1313). The transferred result 1112 is received by the floor interface module 1105 so as to be processed in the application 1112 by the procedures of step S1204 and thereafter.

The floor acquisition request processing in the FloorPolicyServer 1103 will now be described with reference to FIG. 14.

The FloorPolicyServer 1103 judges whether or not the requestFloor request 1110 issued by the FloorServer 1101 in step 1309 is requested in accordance with a suitable floor control policy (step S1401). The result 1111 of the judgement is returned to the FloorServer 1101 (step S1402). Then, the result is notified to the FloorServer 1101 so that the processing of step S1311 and thereafter are continued.

The floor acquisition request is processed by a linkup of the FloorServer 1101, application 1102 and FloorPolicyServer 1103 as described above. The floor release processing is exactly like the floor acquisition processing except that a releaseFloor message is used with respect to the FloorServer 1101 and FloorPolicyServer 1103 in place of a requestFloor message in the floor acquisition request. In the application 1102, the floor release request processing is performed by executing the processing from step S1201 to step S1204 in FIG. 12.

As described above, according to the second embodiment, the floor control mechanism in the groupware system is implemented by a configuration which is different from that of the first embodiment. That is, according to the second embodiment, there is provided a floor interface module which introduces therein a FloorServer for controlling the FloorEntity correspondence table and a FloorPolicyServer for defining the floor control method, which provides a remote message interface required for the floor control, and which makes the remote message interface to be available.

In addition, according to the second embodiment, a system such as a relational algebra can be used for operating the information required for the floor control by controlling a floor related information in the form of a table, thereby providing the effect that the correctness and consistency of the data can be controlled easily.

Furthermore, according to the second embodiment, the floor control mechanism can be put out of the application program by the invoke( ) function. Thus, a load to the application developer can be reduced and the floor control mechanism can be easily incorporated in the existing program.

The present invention may be applied either to a system composed of a plurality of apparatuses or to an apparatus comprising one device. In addition, the present invention can be applied to a case in which a processing defined by the present invention is achieved by supplying a program for executing the processing to the system or apparatus.

As described above, according to the present invention, the following effects can be obtained:

(1) A flexible floor control method which can be shared by different applications, and which can respond to floor models of separate applications, can be provided.

(2) A floor control method which can respond to an application environment in which floor spaces form a complicated hierarchical structure can be provided.

(3) A flexible floor control can be provided which can respond to a dynamic change in a configuration of the floor spaces due to a start and end of the application.

(4) The above-described effects can be implemented without adding to the difficulty for an application developer.

What is claimed is:

1. An information processing apparatus for controlling floors of applications operated in a work environment formed by one or more computers, comprising:

first control means for controlling unit data representing an application which is an object of floor control;

second control means for controlling floor data representing a collection to which said unit data belongs;

acquisition means for acquiring a floor of the application in a floor data to which corresponding unit data belongs by a procedure specified in said floor data in compliance with a request from said application; and modification means for modifying arbirarily a configuration of said unit data and a structure of said floor data.

2. An information processing apparatus according to claim 1, wherein said first and second control means control a configuration of said unit data and a structure of said floor data as hierarchical structures of data.

3. An information processing apparatus according to claim 1, wherein said first and second control means represent a configuration of said unit data and a structure of said floor data by use of a table representing relations of data.

4. An information processing apparatus according to claim 1, wherein the specified procedure in said acquisition means can be shared among a plurality of applications.

5. An information processing apparatus according to claim 1, wherein the specified procedure in said acquisition means is controlled as an independent server program.

6. An information processing apparatus according to claim 1, further comprising modification means for modifying arbitrarily the specified procedure in said acquisition means.

7. An information processing apparatus according to claim 1, further comprising third control means for controlling a correspondence of said application and said unit data.

8. An information processing apparatus according to claim 7, further comprising start means for starting the floor control in said application based on said correspondence.

9. An information processing method for controlling floors of applications operated in a work environment formed by one or more computers, comprising:

a first control step of controlling unit data representing an application which is an object of floor control;

a second control step of controlling floor data representing a collection to which said unit data belongs;

an acquisition step of acquiring a floor of the application in a floor data to which corresponding unit data belongs by a procedure specified in said floor data in compliance with a request from said application; and a modification step of modifying arbirarily a configuration of said unit data and a structure of said floor data.

10. An information processing method according to claim 9, wherein said first and second control steps control a configuration of said unit data and a structure of said floor data as hierarchical structures of data.

11. An information processing method according to claim 9, wherein said first and second control steps represent a configuration of said unit data and a structure of said floor data by use of a table representing relations of data.

12. An information processing method according to claim 9, wherein the specified procedure in said acquisition step can be shared among a plurality of applications.

13. An information processing method according to claim 9, wherein the specified procedure in said acquisition step is controlled as an independent server program.

14. An information processing method according to claim 9, further comprising a modification step of modifying arbitrarily the specified procedure in said acquisition step.

15. An information processing method according to claim 9, further comprising a third control step of controlling a correspondence of said application and said unit data.

16. An information processing method according to claim 15, further comprising a start step of starting the floor control in said application based on said correspondence.

17. A computer readable storage medium sotring a program for implementing an information processing method for controlling floors of applications operated in a work environment formed by one or more computers, said method comprising:

a first control step of controlling unit data representing an application which is an object of floor control;

a second control step of controlling floor data representing a collection to which said unit data belongs;

an acquisition step of acquiring a floor of the application in a floor data to which corresponding unit data belongs by a procedure specified in said floor data in compliance with a request from said application; and a modification step of modifying arbirarily a configuration of said unit data and a structure of said floor data.

18. A storage medium according to claim 17, wherein said first and second control steps control a configuration of said unit data and a structure of said floor data as hierarchical structures of data.

19. A storage medium according to claim 17, wherein said first and second control steps represent a configuration of said unit data and a structure of said floor data by use of a table representing relations of data.

20. A storage medium according to claim 17, wherein the specified procedure in said acquisition step can be shared among a plurality of applications.

21. A storage medium according to claim 17, wherein the specified procedure in said acquisition step is controlled as an independent server program.

22. A storage medium according to claim 17, further comprising a modification step of modifying arbitrarily the specified procedure in said acquisition step.

23. A storage medium according to claim 17, further comprising a third control step of controlling a correspondence of said application and said unit data.

24. A storage medium according to claim 23, further comprising a start step of starting the floor control in said application based on said correspondence.

* * * * *

UNITED STATES PATENT AND TRADEMARK OFFICE
CERTIFICATE OF CORRECTION

PATENT NO. : 5,937,166

DATED : August 10, 1999

INVENTOR(S) : TOSHIHIKO FUKASAWA

It is certified that error appears in the above-identified patent and that said Letters Patent is hereby corrected as shown below:

[56] REFERENCES CITED

U.S. Patent Documents
   "Luwig et al." should read --Ludwig et al.--.

COLUMN 1

Line 23, "a" should be deleted.
   Line 61, "methods," should read --method--.

COLUMN 2

Line 34, "still" should read --a still--.

COLUMN 5

Line 45, "looses" should read --loses--.

COLUMN 8

Line 37, "Floor Unit 504" should read
     --Floor Unit 503--.

UNITED STATES PATENT AND TRADEMARK OFFICE
CERTIFICATE OF CORRECTION

PATENT NO. : 5,937,166

DATED : August 10, 1999

INVENTOR(S) : TOSHIHIKO FUKASAWA

It is certified that error appears in the above-identified patent and that said Letters Patent is hereby corrected as shown below:

COLUMN 10

Line 57, "represent" should read --represents--.

COLUMN 11

Line 7, "n" should read --in--.
Line 25, "mas-" should read --mes--.
Line 41, "massage" should read --message--.

COLUMN 14

Line 45, "step 1309" should read --step S1309--.

COLUMN 15

Line 50, "arbirarily" should read --arbitrarily--.

UNITED STATES PATENT AND TRADEMARK OFFICE
CERTIFICATE OF CORRECTION

PATENT NO. : 5,937,166

DATED : August 10, 1999

INVENTOR(S) : TOSHIHIKO FUKASAWA

It is certified that error appears in the above-identified patent and that said Letters Patent is hereby corrected as shown below:

COLUMN 16

```
Line 22, "arbirarily" should read --arbitrarily--.
Line 50, "sotring" should read --storing--.
Line 63, "arbirarily" should read --arbitrarily--.
```

Signed and Sealed this

Sixth Day of June, 2000

Attest:

Q. TODD DICKINSON

*Attesting Officer*     *Director of Patents and Trademarks*